(12) United States Patent
Katsumata et al.

(10) Patent No.: US 7,417,642 B2
(45) Date of Patent: Aug. 26, 2008

(54) IMAGE DISPLAY DEVICE AND IMAGE DISPLAY METHOD

(75) Inventors: Masaya Katsumata, Sagamihara (JP); Toru Wada, Niiza (JP); Takeyuki Ajito, Hachioji (JP); Yasuhiro Komiya, Hino (JP)

(73) Assignee: Olympus Corporation, Tokyo (JP)

( * ) Notice: Subject to any disclaimer, the term of this patent is extended or adjusted under 35 U.S.C. 154(b) by 146 days.

(21) Appl. No.: 11/397,980

(22) Filed: Apr. 5, 2006

(65) Prior Publication Data

US 2006/0188150 A1    Aug. 24, 2006

Related U.S. Application Data

(63) Continuation of application No. PCT/JP2004/014846, filed on Oct. 7, 2004.

(30) Foreign Application Priority Data

Oct. 7, 2003    (JP) .............................. 2003-348624

(51) Int. Cl.
- *G06K 9/00*    (2006.01)
- *G06F 3/00*    (2006.01)
- *G03B 19/18*   (2006.01)
- *H04N 5/445*   (2006.01)
- *G06F 13/00*   (2006.01)
- *H04N 9/04*    (2006.01)
- *H04N 7/00*    (2006.01)

(52) U.S. Cl. .................... 345/589; 345/593; 345/601; 382/162; 382/165; 352/53

(58) Field of Classification Search .................. 345/600, 345/581, 589–591, 593–594, 597, 601, 549; 348/22.1, 231.6, 335, 342; 358/515–520; 382/162–167; 725/37–41, 61; 352/53, 57, 352/66

See application file for complete search history.

(56) References Cited

U.S. PATENT DOCUMENTS 5,729,011 A    3/1998    Sekiguchi (Continued)

FOREIGN PATENT DOCUMENTS

JP    55-9153 A    1/1980

(Continued)

OTHER PUBLICATIONS

Related U.S. Appl. No. 11/397,970, filed Apr. 5, 2006; Inventor: M. Katsumata et al.

(Continued)

*Primary Examiner*—Sajous Wesner
(74) *Attorney, Agent, or Firm*—Frishauf, Holtz, Goodman & Chick, P.C.

(57) ABSTRACT

An image display device which displays a multiband image acquired by a multiband camera capable of capturing two or more bands comprises a parameter input/output and image outputting screen configured to represent each band itself or an image of the band, a band-RGB conversion table configured to use for converting a band number into a color represented in the a parameter input/output and image outputting screen, and wavelength information converting unit configured to calculate the band itself or the color representing the image of the band from the band number by use of the band-RGB conversion table to output the band or the color to the a parameter input/output and image outputting screen.

11 Claims, 7 Drawing Sheets

U.S. PATENT DOCUMENTS

| | | | |
|---|---|---|---|
| 6,151,424 A * | 11/2000 | Hsu | 382/294 |
| 6,211,971 B1 * | 4/2001 | Specht | 358/1.9 |
| 6,335,984 B1 | 1/2002 | Taguchi | |
| 6,404,920 B1 * | 6/2002 | Hsu | 382/190 |
| 6,549,653 B1 | 4/2003 | Osawa et al. | |
| 2001/0051004 A1 * | 12/2001 | Wang | 382/206 |
| 2002/0114533 A1 * | 8/2002 | Smith et al. | 382/275 |
| 2003/0046004 A1 * | 3/2003 | White et al. | 702/1 |
| 2004/0246345 A1 * | 12/2004 | Ohsawa et al. | 348/222.1 |
| 2006/0122954 A1 * | 6/2006 | Podlasek et al. | 706/920 |

FOREIGN PATENT DOCUMENTS

| | | |
|---|---|---|
| JP | 4-172789 A | 6/1992 |
| JP | 5-34202 A | 2/1993 |
| JP | 5-183916 A | 7/1993 |
| JP | 6-8897 A | 1/1994 |
| JP | 6-241905 A | 9/1994 |
| JP | 8-233658 A | 9/1996 |
| JP | 11-154220 A | 6/1999 |
| JP | 2000-196965 A | 7/2000 |
| JP | 2000-329617 A | 11/2000 |
| JP | 2001-5046 A | 1/2001 |
| JP | 2001-99710 A | 4/2001 |
| JP | 2002-112101 A | 4/2002 |
| JP | 2002-149148 A | 5/2002 |
| JP | 2004-5566 A | 1/2004 |
| JP | 2004-147287 A | 5/2004 |
| JP | 2004-219092 A | 8/2004 |

OTHER PUBLICATIONS

Related U.S. Appl. No. 11/397,971, filed Apr. 5, 2006; Inventor: M. Katsumata et al.

Notification Concerning Transmittal of Copy of International Preliminary Report on Patentability and Written Opinion for PCT/JP2004/014846; 5 sheets.

* cited by examiner

| Band | Red | Green | Blue |
|---|---|---|---|
| 1 | 0 | 0 | 0 |
| 2 | 70 | 10 | 255 |
| 3 | 0 | 50 | 252 |
| 4 | 5 | 150 | 252 |
| ... | | | |
| 18 | 255 | 255 | 255 |

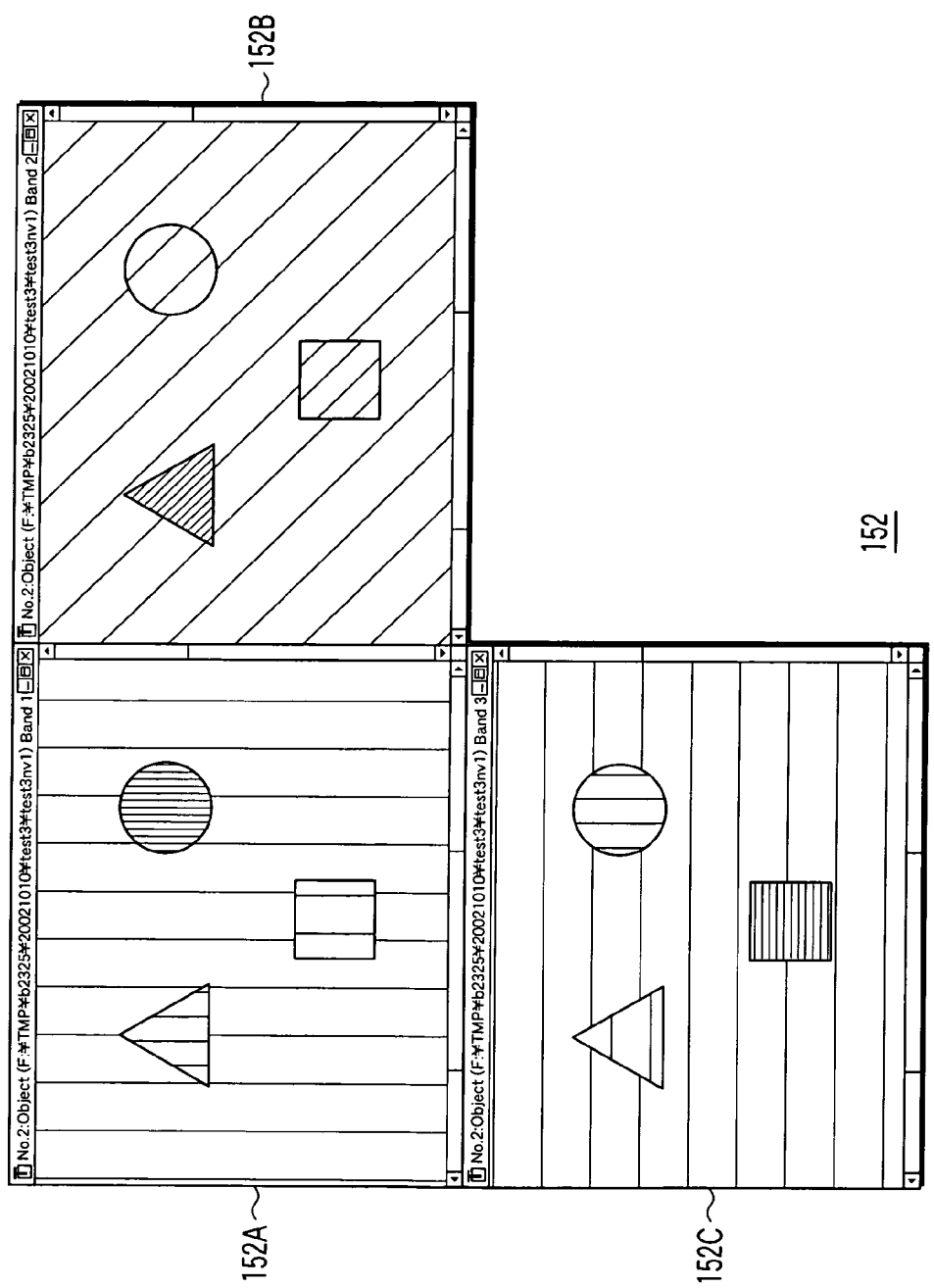
F I G. 5

| Band | Central wavelength [nm] | Half-value width [nm] | ... |
|---|---|---|---|
| 1 | Black | - | |
| 2 | 450 | 11 | |
| 3 | 465 | 20 | |
| 4 | 505 | 30 | |
| ... | | | |
| 9 | White | - | |

~131

| Wavelength [nm] | Red | Green | Blue |
|---|---|---|---|
| 380 | 255 | 0 | 0 |
| 381 | 255 | 1 | 1 |
| 382 | 255 | 2 | 2 |
| 383 | 255 | 3 | 3 |
| ... | | | |
| 450 | 70 | 10 | 255 |
| ... | | | |
| 780 | 20 | 0 | 255 |
~132
F I G. 10
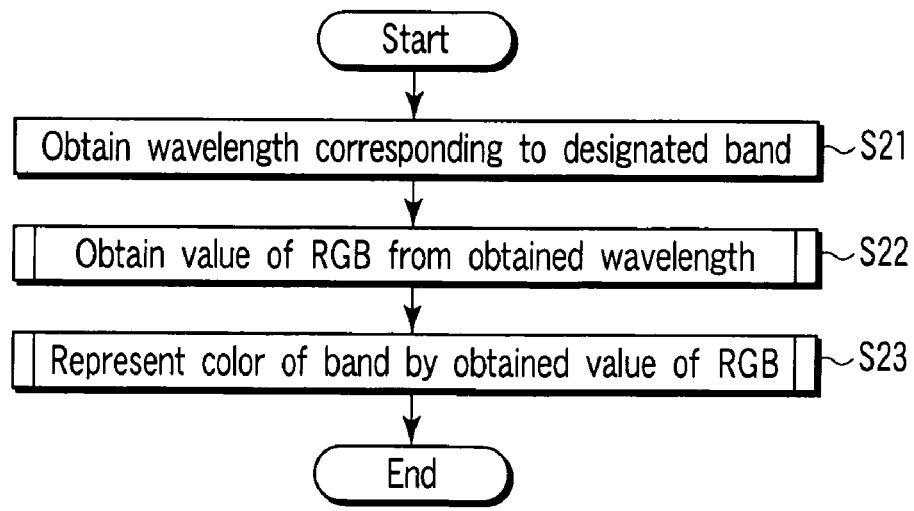
F I G. 11

| Wavelength [nm] | X | Y | Z |
|---|---|---|---|
| 380 | 0.001368 | 0.000039 | 0.00645 |
| 381 | 0.001502 | 4.28E-05 | 0.007083 |
| 382 | 0.001642 | 4.69E-05 | 0.007745 |
| 383 | 0.001802 | 5.16E-05 | 0.008501 |
| ... | | | |
| 780 | 4.15E-05 | 1.5E-05 | 0 |

~133

IMAGE DISPLAY DEVICE AND IMAGE DISPLAY METHOD

CROSS-REFERENCE TO RELATED APPLICATIONS

This is a Continuation Application of PCT Application No. PCT/JP2004/014846, filed Oct. 7, 2004, which was published under PCT Article 21(2) in Japanese.

This application is based upon and claims the benefit of priority from prior Japanese Patent Application No. 2003-348624, filed Oct. 7, 2003, the entire contents of which are incorporated herein by reference.

BACKGROUND OF THE INVENTION

1. Field of the Invention

The present invention relates to an image display device and an image display method in which a multiband image acquired by a multispectral camera is designated for each band, and the designated band image is displayed.

2. Description of the Related Art

In general, a multiband camera refers to a camera which captures an image with a plurality of bands having more specific wavelength transmission characteristics as compared with R, G, and B filters of a usual three-band color camera. As means for switching the band, there are used, for example, a wavelength variable filter disclosed in Jpn. Pat. Appln. KOKAI Publication No. 2001-99710 and a rotary filter disclosed in U.S. Pat. No. 6,549,653. The number of the bands differs with a device or a purpose, but transmittance characteristics in the bands are shown in, for example, FIG. 2 of Jpn. Pat. Appln. KOKAI Publication No. 2001-99710.

As many captured images generally exist as bands. Therefore, 16 images by 16 bands exist in FIG. 2 of Jpn. Pat. Appln. KOKAI Publication No. 2001-99710, and ten images by ten bands exist in the rotary filter shown in FIG. 5B of U.S. Pat. No. 6,549,653.

Here, as to the switching of the band, for example, in the images of 18 bands, there is considered a method of displaying a graphical user interface (hereinafter abbreviated as GUI) for selecting the band from 18 bands to switch the band. Moreover, there is considered a method of displaying the GUI including various setting items to switch the band depending on, for example, the selection items of "Filter/Band". However, it is difficult to imagine the wavelength indicated by the band from the band number only.

The switching of the band means that certain information peculiar to the band or the image of the band is desired to be viewed. In the multiband camera, the band means that the band has peculiar wavelength information and that the information on the wavelength usually in a narrowband intends to be acquired as the characteristics of each band as in the transmittance characteristics shown in FIG. 2 of Jpn. Pat. Appln. KOKAI Publication No. 2001-99710. Therefore, the user constantly combines the transmittance characteristics of the wavelength with which the image is to be acquired, especially a central wavelength with the band to operate the GUI.

BRIEF SUMMARY OF THE INVENTION

According to a first aspect of the present invention, there is provided an image display device which displays a multiband image acquired by a multiband camera capable of capturing at least two bands, the device comprising:

an output screen configured to represent one of each band itself and an image of the band;

a conversion table configured to use for converting a band number into a color represented in the output screen; and processing unit configured to calculate one of the band itself and the color representing the image of the band from the band number by use of the conversion table to output one of the band and the color to the output screen.

According to a second aspect of the present invention, there is provided an image display method which displays a multiband image acquired by a multiband camera capable of capturing at least two bands, the method comprising:

preparing a conversion table configured to use for converting a band number into a color representing one of each band itself and an image of the band in an output screen; and calculating one of the band itself and the color representing the image of the band from the band number by use of the conversion table to output one of the band and the color to the output screen.

According to a third aspect of the present invention, there is provided an image display device which displays a multiband image acquired by a multiband camera capable of capturing at least two bands, the device comprising:

display means having an output screen which represents one of each band itself and an image of the band;

a conversion table for converting a band number into a color represented in the output screen; and processing means for calculating one of the band itself and the color representing the image of the band from the band number by use of the conversion table to output one of the band and the color to the output screen of the display means.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a diagram showing an image outputting screen in an image display device according to a second embodiment of the present invention;

FIG. 10 is a diagram showing contents of a wavelength-RGB conversion table;

FIG. 11 is a diagram showing an operation flowchart of a wavelength information converting unit in the fourth embodiment;

DETAILED DESCRIPTION OF THE INVENTION

There will be described hereinafter best modes for carrying out the present invention with reference to the drawings.

First Embodiment

Figures 1, 2:
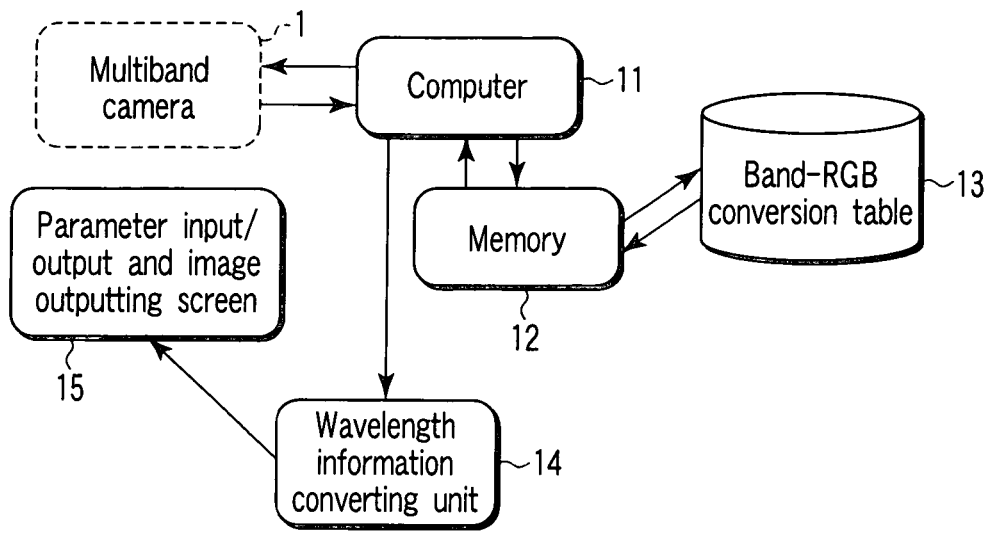
FIG. 1 is a diagram showing a configuration of an image display device according to a first embodiment of the present invention.
FIG. 2 is a diagram showing contents of a band-RGB conversion table.

As shown in FIG. 1, an image display device according to a first embodiment of the present invention is configured of: a computer 11; a memory 12; a band-RGB conversion table 13; a wavelength information converting unit 14; and a parameter input/output and image outputting screen 15.

Here, the computer 11 has a function of controlling a multiband camera 1. In general, the multiband camera 1 contains a CCD as an image capture element, and captures an image to send image data as electronic data to the computer 11. Various settings have to be performed on the multiband camera 1 to acquire user's intended image. For example, there are considered settings of an exposure time (shutter speed), diaphragm, focal position and the like. A user displays a live image sent from the multiband camera 1 in the parameter input/output and image outputting screen 15. In the present embodiment, this screen corresponds to a display attached to the computer 11. A multiband image captured by the multiband camera 1 is stored in the memory 12 which can be recognized by the computer 11 in the image display device. It is also considered that the image is stored in a storage medium such as a hard disk drive (HDD) if necessary for the user. In the hard disk, the band-RGB conversion table 13 is stored in addition to a program itself as software and the above-described image file acquired by the multiband camera 1 in the past. Needless to say, the multiband camera 1 does not have to be necessarily used at a time when the image is displayed or the image data is processed using the past image file. When the band color display is required, the wavelength information converting unit 14 obtains RGB colors from a band number by use of the band-RGB conversion table 13, and displays the colors in the parameter input/output and image outputting screen 15 to represent the color in a GUI.

There will be described a method of representing the band color by use of the band-RGB conversion table 13 in actual.

The band number is given in the multiband camera 1, and it is assumed that there are 18 bands in this example. In each band, a filter having, for example, narrowband wavelength characteristics is selected with a filter wheel. Bands 2 to 17 are switched with the filter having a central wavelength of a short wavelength in the vicinity of 400 nm and a long wavelength in the vicinity of 700 nm for the sake of convenience, but the bands do not have to be especially arranged in order from the short wavelength. Band 1 is capable of capturing a shielded image, that is, ideally an image having a luminance of zero (0) which is a signal value to calculate a bias value including a dark current or the like of a light receiving element of the multiband camera 1. In band 18, the user can observe a subject in natural color which is not passed through any filter without using any filter.

In this example, since a personal computer as a PC-AT compatible computer by IBM Corp. is used as the computer 11, luminance of each of R, G, and B is represented by a range of (0 to 255). In this case, (R,G,B)=(0,0,0) can represent black, (255,255,255) can represent white, (255,0,0) can represent red, (0,255,0) represents green, and (0,0,255) can represent blue. When intermediate values of 0 to 255 are freely combined, 16777216 colors can be displayed in the display.

There is shown the band-RGB conversion table 13 indicating wavelengths of 18 bands of an 18-band camera for use in the present embodiment as shown in FIG. 2. Here, a leftmost column indicates band numbers of 1 to 18. A second column shows numeric values indicating the luminance of red, a third column shows those indicating the luminance of green, and a fourth column shows those indicating the luminance of blue. In the band 1, the shielded image is captured as described above. Therefore, (R,G,B)=(0,0,0) is set because this is easily seen. Similarly, in the band 18, (R,G,B)=(255,255,255) is set in the sense that a through image is represented without any filter.

Next, there will be described a method in which the personal computer actually represents the band colors by use of this band-RGB conversion table 13. In the present embodiment, the wavelength information converting unit 14 utilizes this band-RGB conversion table 13. Actual contents of the band-RGB conversion table 13 are shown in FIG. 2 as described above. The wavelength information converting unit 14 performs processing shown in a flowchart of FIG. 3 with respect to each of the 18 bands.

Figure 4:
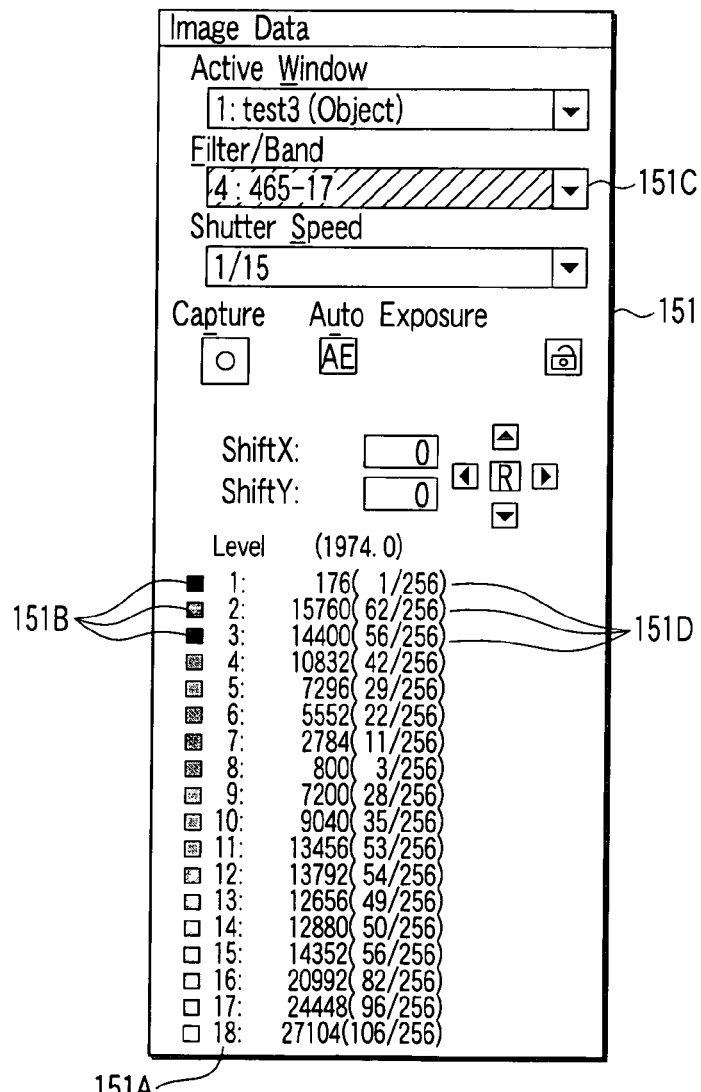
FIG. 4 is a diagram showing a GUI for designating a band.

That is, first in the band 1, values of (R,G,B) at this time are obtained (step S11). Here, (R,G,B)=(0,0,0) is seen from a second line of the band-RGB conversion table 13 shown in FIG. 2. Next, the band 1 is represented by this coloration (step S12). In this example, this band is represented as a square icon. That is, in this step S12, an operation of drawing the icon is performed. As a result, a GUI 151 for designating the band is displayed in the parameter input/output and image outputting screen 15 as shown in FIG. 4. That is, it is seen that a black quadrangular icon 151B is represented on the left side of "1" which is a band number 151A under "Level". When the band 2 is obtained in a similar step, (R,G,B)=(70, 10, 255). Therefore, this is represented by a purple-based blue quadrangular icon 151B on the left side of the band number "2" of FIG. 4. When such processing is performed up to the band 18, all band colors can be represented as the quadrangular icons 151B on the left sides of the band numbers of FIG. 4.

Among these 18 icons 151B, the designated band can be selected by clicking the icon by use of a mouse which is a pointing device. For example, when the blue quadrangular icon 151B of number "3" indicating the band 3 is clicked, there is obtained the same effect as that of selecting "3:" with a second "Filter/Band" list box 151C from the top of the GUI. The quadrangular icons 151B are shown on the left sides of the band numbers 151A of 1 to 18 under "Level", but an icon shape may be any shape including a circle, the number itself may be colored, or each number may be represented in white or black in the icon.

Moreover, when information of a central wavelength and half-value width 151D is displayed as an aid in a space disposed on the right side of the band number 151A as shown in the "Filter/Band" list box 151C, convenience is improved. Alternatively, this information may be displayed as annotation, when a mouse pointer (not shown) is matched on the color icon 151B or the band number 151A to perform right-click of a mouse, or when the pointer is simply matched.

By the above-described method, it is possible to represent the central wavelength of each band by the icon 151B converted with the RGB color together with the band number 151A indicating the band. Since this icon 151B can be clicked to select the band, the user can reduce erroneous operations, and quickly switch to a target band. It is also possible to arrange and display all the bands and to grasp the whole configuration. Furthermore, the bands sometimes include a band for seeing the through image without using any shield band or any narrowband filter, the band being unrelated to the narrowband wavelength characteristics, but there is also an effect that the band can be distinguished by the color at a glance.

That is, according to the present embodiment, as a method of represent the band in the GUI of the software which handles the multiband image obtained by the multiband camera 1, the band can be converted into the color which can be represented in the GUI by use of wavelength information attached to the band. When an end user controls the software by use of this color, the band can be selected while being conscious of the band wavelength. The user can save a trouble of correctly memorizing the correspondence between the band and the wavelength. That is, the user can designate the band or confirm the image with reference to the color which represents the band. Moreover, by a method of clicking the icon 151B using the color representing the band, band assignment such as the band designation is possible, and it is possible to reduce operational mistakes or troubles.

Second Embodiment

A configuration of an image display device according to a second embodiment of the present invention is similar to that in the first embodiment shown in FIG. 1: with the proviso that the parameter input/output and image outputting screen 15 displays the GUI 151 for designating a band, and displays the band color in the quadrangular icon 151B on the left side of the band number 151A of, for example, "1" in the first embodiment shown in FIG. 4. However, since an image is displayed in the present embodiment, an image outputting screen 152 is displayed as shown in FIG. 5.

In the present embodiment, a multiband camera 1 has three bands, and central wavelengths of the bands 1, 2, and 3 are 650 nm, 550 nm, and 450 nm, respectively. At this time, it is assumed that values of a band-RGB conversion table 13 are (R,G,B)=(240,36,0) in band 1, (R,G,B)=(32,240,0) in band 2, and (R,G,B)=(0,48,248) in band 3.

Next, there will be described a method in which a personal computer actually displays an image by use of the band color based on this band-RGB conversion table 13.

When the band colors of the bands 1 to 3 are obtained using the band-RGB conversion table 13 in the same manner as in the above first embodiment, the band-RGB conversion table 13 is used as described above. Therefore, (R,G,B)=(240,36,0) is obtained in the band 1, (R,G,B)=(32,240,0) is obtained in the band 2, and (R,G,B)=(0,48,248) is obtained in the band 3. On the other hand, each band image is represented by luminance of 0 to 255 in the band. During digitizing, a value of 12 bits, 16 bits or the like is output depending the multiband camera 1. All pixel data sometimes has image data as a value of 2 bytes or the like exceeding 8 bits. However, even in this case, a display attached to a personal computer has three bands of R, G, and B. In case of 256 gradations, internal data has to be displayed in 8-bit 256 gradations even with a length of plurality of bytes. To represent each band by a gray tone, an image may be displayed in a range of 0 to 255 with a value of R=G=B.

In the present embodiment, the image is displayed using the obtained band color. That is, a portion corresponding to a gray tone value of 255 may be displayed in the color obtained from the table. To display the image of the band 1, the value of 255 corresponds to (R,G,B)=(240,36,0). For example, an image luminance value of 128 is a half of the value of 255. Therefore, the image is displayed in the color of (120,18,0). Since a value of 64 is ¼, the pixel may be represented by the color of (60,9,0). When this is performed on all of the pixels, the image of the band 1 can be represented by an upper left window 152A of FIG. 5. Similarly, when the images are displayed so that maximum luminance values are (R,G,B)= (32,240,0) in the band 2, and further (R,G,B)=(0,48,248) in the band 3, the band 2 can be displayed as an upper right window 152B, and the band 3 can be displayed as a lower left window 152C in FIG. 5.

They can be calculated, when the band color is known. The color on the display is set to (R,G,B)=(Mr, Mg, Mb), and M vector is used. Assuming that a pixel value of band n is In, a range of the multiband camera 1 is Rc, a display range to be displayed is Rd, and a brightness correction coefficient is k, the color of the band n is obtained as (R,G,B)=(Br, Bg, Bb) from the band-RGB conversion table 13. When this is assumed as B vector, M can be given by the following equation:

$$M = (In/Rc \times Rd \times k) \times B.$$

Assuming that a pixel luminance is a value of 128 (=In) in the band, an example is calculated. With k=1, B=(240,36,0) results. Since each of the multiband camera 1 and the display indicates Rc=Rd=256 in 8-bit gradations, at this time the following M128 is obtained as described above:

$$M128 = (128/256 \times 256 \times 1) \times (240, 36, 0)$$
$$= 1/2 \times (240, 36, 0)$$
$$= (120, 18, 0).$$

Therefore, any gradation of Rc or Rd can be represented, and brightness may be adjusted with the correction coefficient k. A nonlinear correction coefficient such as γ may be inserted, although not described in this equation.

As shown in FIG. 5, all of the given bands of the multiband camera 1 can be displayed by the windows by the above method. Needless to say, an only noted band may be displayed, although not shown here. Since there are three bands in this embodiment, they may be superimposed and displayed upon one screen, that is, one window.

In a case where the image is displayed using the color close to the central wavelength of the band of the multiband camera 1 by the above method, when the image is simply looked at, there is seen at a glance the band as an object with respect to which the image is displayed. In a case where the multiband camera 1 switches the band with the filter having the narrowband wavelength characteristics, or a case where the band is switched using a narrowband light source having illuminative wavelength characteristics, and the multiband camera 1 itself can visually confirm a position immediately before a light receiving element as in a single lens reflex camera, the color similar to an apparent color can be reproduced on the display.

Moreover, in a case where a plurality of bands are superimposed upon one another, and displayed as one image, when the color of the image or the neutral color between the bands is viewed, there is an effect that it is possible to grasp a difference of characteristics between the bands of the image, that is, between the wavelengths.

Third Embodiment

Since a multiband camera 1 generally has three or more bands in many cases, it is difficult to display an image in a display of a computer. That is, the number of the bands of the multiband camera 1 exceeds three colors of R, G, and B in the display in many cases. There will be described a method of assigning all or a part of the bands of the multiband camera 1 to the bands of the display to display the image in this case in a third embodiment of the present invention.

Figure 6:
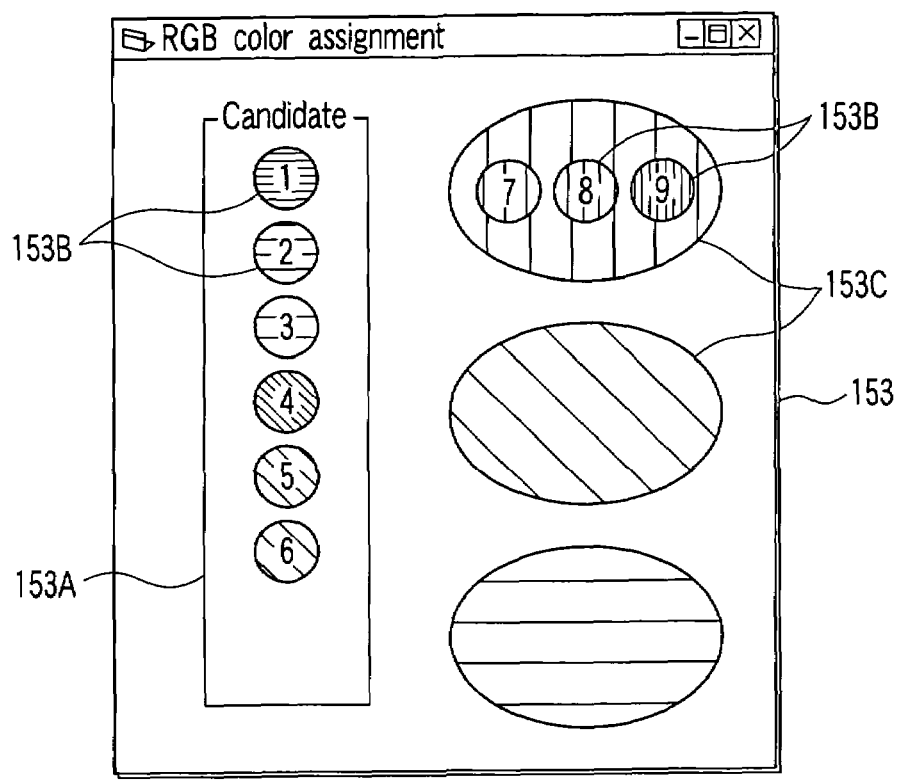
FIG. 6 is a diagram showing a setting GUI in an image display device according to a third embodiment of the present invention.

A configuration of an image display device according to the present embodiment is similar to that of the first embodiment shown in FIG. 1. However, a parameter input/output and image outputting screen 15 has a function of representing the band itself by the color as shown in FIG. 6, and displaying the image as shown in FIG. 5.

Figure 7:
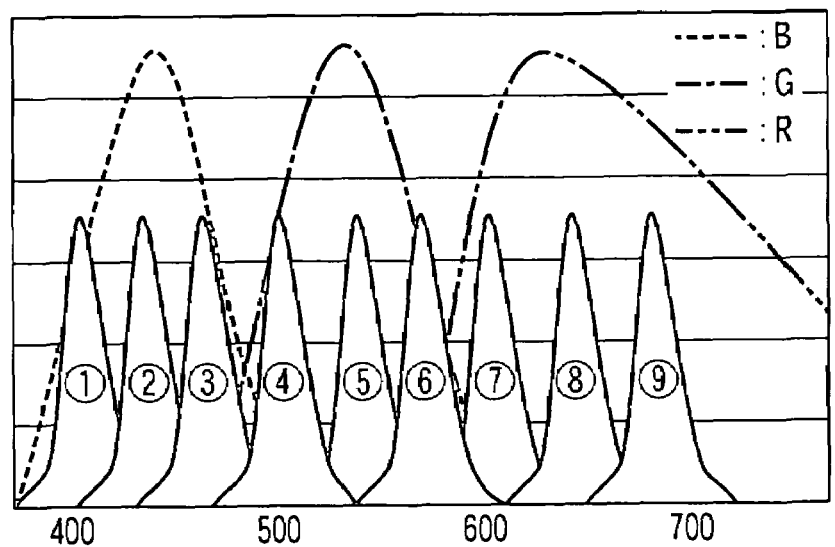
FIG. 7 is a diagram showing wavelength characteristics of a 9-band multiband camera and a 3-band display.

In the present embodiment, it is assumed that the multiband camera 1 has nine bands, the display of the personal computer has three bands, and wavelength characteristics of the camera and the display are as shown in FIG. 7. That is, in FIG. 7, nine narrowband waveforms denoted with circled numerals show characteristics of bands 1 to 9 of the multiband camera 1, and broken-line, one-dot-chain-line, and two-dot-broken-line waveforms show the characteristics of B, G, and R of the computer display.

First, there is considered a case where all or a part of the bands of the multiband camera 1 are to be assigned to the existing R, G, and B of the display. It is considered that a user selects the band, and displays an image of the band as a gray tone as in a conventional technology, or obtains and displays the color of the band as in the above second embodiment, when the image is to be displayed for each band. It is also considered that each band is assigned to each of the bands of R, G, and B to display the image. In such case, when there are nine bands as in this example, the assigning method can be performed to assign B to the band 1, G to the band 4, and R to the band 7, or assign B to the band 3, G to the band 6, and R to the band 9. However, even with any combination, R, G, and B color images are observed in three bands which have narrowband wavelength characteristics and which are remarkably little superimposed as shown in the wavelength characteristics of FIG. 7, and it is not possible to represent the image by coloration close to that actually viewed with human eyes. Therefore, if a plurality of bands can be assigned to R, G, or B of the display, it is expected that there can be displayed an image close to that captured by a three-band color CCD camera depending on the wavelength characteristics of the bands. In the present embodiment, since the number of the bands of the multiband camera 1 is nine, and the characteristics of the respective bands are as shown in FIG. 7, it is seen that the bands 1, 2, and 3 may be assigned to B, the bands 4, 5, and 6 may be assigned to G, and the bands 7, 8, and 9 may be assigned to R to display the image. For this purpose, it is possible to assign one or more bands to R, G, or B by use of a setting GUI 153 shown in FIG. 6.

Next, there will be described a method of actually preparing the setting GUI 153 of FIG. 6, and a method of assigning the bands by use of this GUI.

First, icons indicating nine bands are prepared. A band-RGB conversion table shown in FIG. 2 is used. However, in this example, the number of the bands is nine, and R, G, and B of each band have different values. That is, there is used a table indicating colors of central wavelengths of the respective bands given by FIG. 7. Values of (R,G,B) of the bands 1 to 9 are obtained beforehand by use of the table by the procedure described above in the first embodiment. Moreover, the resultant bands are represented by circles, the circles are marked with the resultant colors, and the band number is displayed in the vicinity of the center of each circle. In FIG. 6, icons 153B of the bands before assigned are displayed in a "candidate" frame 153A on the left side of the setting GUI 153. Right-side upper, intermediate, and lower ellipses 153C show three primary colors of R, G, and B represented in the display attached to the personal computer. The three primary colors are represented by (R,G,B), and (255,0,0) in R, (0,255, 0) in G, and (0,0,255) in B can be represented as each maximum luminance.

Icons of all of the bands 1 to 9 of the multiband camera 1 are displayed as candidates to be assigned, and an end user may drag & drop band icons 153B to the right-side R, G, and B ellipses 153C of the display. FIG. 6 shows an example in which the bands 7, 8, and 9 only are assigned to R of the display, and the bands 1 to 6 remain as the candidates without being assigned yet. Thereafter, if the user assigns the bands 4, 5, and 6 to G, and the bands 1, 2, and 3 to B, as shown in FIG. 7, the central wavelengths of the respective bands can be matched and displayed with usual display characteristics of the three primary colors. Accordingly, when these assigned R, G, and B bands are superimposed on one another, and displayed as one image, it is possible to observe a subject having coloration close to that of an image viewed with a naked eye in the display.

However, the central wavelengths of the respective bands do not have to be necessarily matched with the wavelength characteristics of the display, and all of the bands do not have to be used depending on user's purpose. Therefore, the band 3 may be assigned to R, the bands 1 and 2 may be assigned to G, and the band 4 may be assigned to B, or anything is not assigned to B. The assignments may be freely set depending on the user's purpose.

Furthermore, the three primary colors of R, G, and B of the display do not have to be necessarily assigned (ellipses 153C) on the right side in the display of FIG. 6. For example, it may be considered that only two colors of yellow and light blue be output. Yellow is represented by (R,G,B)=(255,255,0), and light blue is represented by (R,G,B)=(0,255,255). In addition, any neutral color may be selected as an output object on the right side. As to the assignments, as described above, the bands may be assigned such as no assignment, only one band, and a combination of a plurality of bands.

It is to be noted that in a case where a central wavelength and a half-value width of actual wavelengths are to be known with the icon 153B for each band in FIG. 6, when a mouse pointer (not shown) is matched with the desired icon 153B, the central wavelength and the half-value width may be displayed as annotations. Alternatively, when a mouse is right-clicked, they may be displayed in a menu.

When the bands of the multiband camera 1 are represented by the colors, and the bands are further assigned to the display colors in the setting GUI 153 shown in FIG. 6 by the above-described method, the bands can be visually assigned while comparing the original color of the band as the displayed color. When the assigned colors are not limited to the primary colors of R, G, and B, and the bands are assigned to the neutral colors, the arbitrary number of objects can be stored without fixing the assignments to the three primary colors. In consequence, there is an effect that the user can evaluate the image captured with the multiband camera 1 while being conscious of wavelengths such as the band central wavelengths, and being visually conscious of the original band colors, the output display, the number of the display colors, the number of the primary colors and the like. It is possible to assign the bands to a display device such as the display by the method of dragging & dropping the icons 153B using the colors representing the bands, and operational mistakes or troubles can be reduced.

Fourth Embodiment

Figures 8, 9:
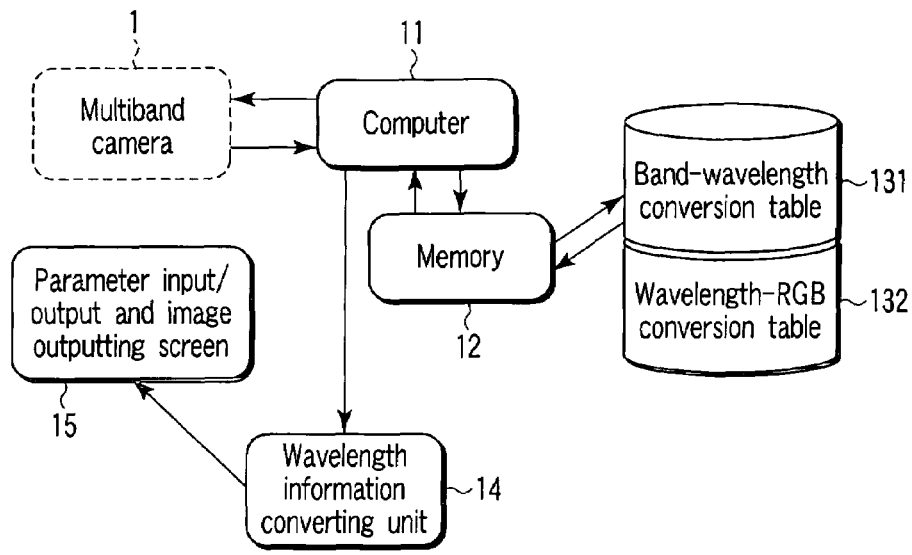
FIG. 8 is a diagram showing a configuration of an image display device according to a fourth embodiment of the present invention.
FIG. 9 is a diagram showing contents of a band-wavelength conversion table.

In an image display device according to a fourth embodiment of the present invention, as shown in FIG. 8, values of RGB are indirectly converted using a band-wavelength conversion table 131 and a wavelength-RGB conversion table 132 shown in FIGS. 9 and 10 instead of the band-RGB conversion table 13 for directly obtaining the values of RGB for each band as in the above first to third embodiments.

In the present embodiment, it is also assumed that a multiband camera 1 has nine bands, a personal computer display has three bands, and wavelength characteristics of the camera and the display are as shown in FIG. 7. Moreover, there will be considered a case where all or a part of the bands of the multiband camera 1 are to be assigned to the existing R, G, and B of the display.

There will be described a method performed by a wavelength information converting unit 14 by use of a flowchart of FIG. 11. In the above third embodiment, the flowchart shown in FIG. 3 and the band-RGB conversion table 13 shown in FIG. 2 have been used to obtain the values of RGB representing the band colors for the respective bands. This corresponds to the flowchart of FIG. 11, the band-wavelength conversion table 131 shown in FIG. 9, and the wavelength-RGB conversion table 132 shown in FIG. 10.

That is, first the wavelength corresponding to the designated band is obtained using the band-wavelength conversion table 131 (step S21).

Since "Black" is written in a portion of the band-wavelength conversion table 131 corresponding to the central wavelength of the band 1, it is seen from the table that this band is a shield band irrespective of the wavelength. Therefore, (R,G,B)=(0,0,0) is assumed, and processing of step S23 described later is performed without any condition.

Next, the values are obtained in the band 2. In step S21, it is seen from the band-wavelength conversion table 131 that the central wavelength is 450 nm. Next, the values of RGB are obtained from the resultant central wavelength (step S22). That is, since it is seen in step S21 that the band 2 has a central wavelength of 450 nm, the wavelength is applied to the above wavelength-RGB conversion table 132. In this wavelength-RGB conversion table 132, values of Red, Green, and Blue are described with respect to a wavelength of 380 nm to 780 nm in a first column. It is seen that the values are actually (R,G,B)=(70,10,255) in 450 nm. Moreover, in the next step S23, display processing is performed, and this step is equivalent to the step S12 of FIG. 3.

It is similarly seen with reference to the band-wavelength conversion table 131 in step S21 that the central wavelength is 465 nm in the band 3. Moreover, when the values of RGB in the wavelength of 465 nm are obtained from the wavelength-RGB conversion table 132 in step S22, (R,G,B)=(0,50,252) is obtained, although omitted from FIG. 10. The band is represented by the value in the step S23.

Similarly in the band 4, a central wavelength of 505 nm and (R,G,B)=(5,150,252) are obtained. Similar processing is performed in the bands 5 to 8 hereinafter.

Moreover, when the band-wavelength conversion table 131 is referred to in step S21, the last band 9 indicates "White", and it is seen that this band is a band which does not depend on the wavelength without any filter. Therefore, (R,G,B)=(255,255,255) is assumed, and the processing of step S23 is performed without any condition.

Figure 3:
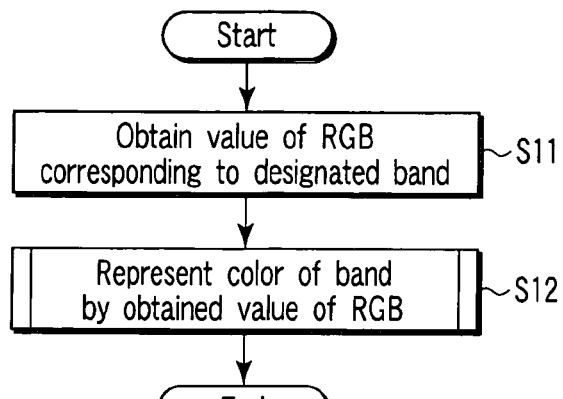
FIG. 3 is a diagram showing an operation flowchart of a wavelength information converting unit.

In consequence, the RGB values are obtained, and the band colors can be represented in the same manner as in the third embodiment in which the band-RGB conversion table 13 is referred to in the step S12 of FIG. 3.

It is to be noted that in the present embodiment, the 9-band multiband camera 1 is presumed, but when the method of the present embodiment is performed, the number of the bands does not have to be especially nine, and the number of the band-wavelength conversion tables 131 may be increased or decreased to handle the bands. The bands which are not related to the wavelength are represented by "Black" and "White", and the respective RGB values are obtained as (R,G,B)=(0,0,0) and (R,G,B)=(255,255,255), but the representing terms may be changed, or other types may be increased, and the corresponding RGB values may be defined. In the wavelength-RGB conversion table 132, the wavelengths are shown every nm in a typical visible regions of 380 nm to 780 nm. However, start and end of the table may not be limited to 380 nm and 780 nm, and an interval does not have to be 1 nm. The interval may be set to, for example, 10 nm, and the RGB values may be obtained with respect to a portion where any value does not exist by use of a certain interpolating method.

When the bands of the multiband camera 1 are represented by the colors, and the bands are further assigned to the display colors in the setting GUI 153 shown in FIG. 6 by the above-described method, the bands can be visually assigned while comparing the original colors of the bands with the display colors. When the assigned colors are not limited to the primary colors of R, G, and B, and the bands are assigned to the neutral colors, the arbitrary number of objects can be stored without fixing the assignments to the three primary colors. In consequence, there is an effect that the user can evaluate the image photographed with the multiband camera 1 while being conscious of wavelengths such as the band central wavelengths, and being visually conscious of the original band colors, the output display, the number of the display colors, the number of the primary colors and the like.

Moreover, since the association between the band numbers and the RGB values corresponding to the above-described band-RGB conversion table 13 is divided into the band-wavelength conversion table 131 and the wavelength-RGB conversion table 132, there may be described data indicating only information on the band numbers and wavelengths such as the central wavelengths in the band-wavelength conversion table 131. If the information or data including the information of the band-wavelength conversion table 131 already exists in software which controls the multiband camera 1 for a purpose of controlling the camera, the information or the data does not have to be newly prepared for the present embodiment, and the existing information or data may be used. Moreover, the wavelengths and the RGB values representing the wavelengths are only described in the wavelength-RGB conversion table 132 irrespective of the bands. Therefore, the table is not influenced even if the table is handled with the multiband camera 1 having any wavelength characteristics and any number of the bands. There is an effect that it is possible to be engaged exclusively in construction of a table of the RGB values which represent the wavelengths.

Fifth Embodiment

Figures 12, 13:
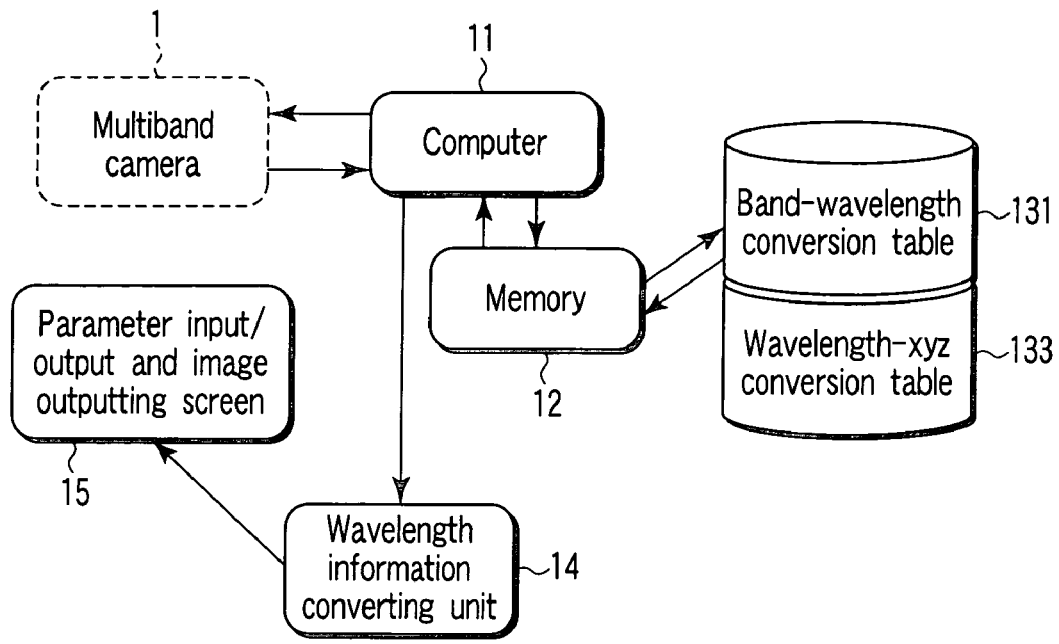
FIG. 12 is a diagram showing a configuration of an image display device according to a fifth embodiment of the present invention.
FIG. 13 is a diagram showing contents of a wavelength-XYZ conversion table.

In an image display device according to a fifth embodiment of the present invention, as shown in FIG. 12, there are used a band-wavelength conversion table 131 shown in FIG. 9 and a wavelength-XYZ conversion table 133 shown in FIG. 13 instead of the band-RGB conversion table 13 for directly obtaining the values of RGB for each band as in the above first to third embodiments. Moreover, XYZ as calorimetric values are obtained from wavelengths obtained from band numbers, and they are indirectly converted into the values of RGB by use of a method described later or the like.

It is to be noted that also in the present embodiment, a multiband camera 1 has nine bands, a personal computer display has three bands, and wavelength characteristics of the camera and the display are as shown in FIG. 7. Moreover, there will be considered a case where all or a part of the bands of the multiband camera 1 are to be assigned to the existing R, G, and B of the display.

There will be described a method performed by a wavelength information converting unit 14 by use of a flowchart of FIG. 11. The wavelength corresponding to the designated band is obtained using the band-wavelength conversion table 131 shown in FIG. 9 in step S21 in the same manner as in the above fourth embodiment. Next, the values of RGB are obtained from the wavelength obtained in step S22. Here, the values of RGB are directly described as output colors to be displayed in the wavelength-RGB conversion table 132, and they can be referred to in the above fourth embodiment. However, the present embodiment is different in the method of this step S22. That is, in the present embodiment, the wavelength-XYZ conversion table 133 shown in FIG. 13 is used instead of the above wavelength-RGB conversion table 132. Since the values obtained with reference to this wavelength-XYZ conversion table 133 are the calorimetric values XYZ with respect to the wavelength, the RGB values are obtained from the calorimetric values XYZ by a method described later. Moreover, display is performed in step S23. The processing of this step S23 is equivalent to that in the above fourth embodiment.

That is, "Black" is written in a portion of the band-wavelength conversion table 131 corresponding to the central wavelength of the band 1, and it is seen that this band does not depend on the wavelength, and is a shield band. Therefore, the processing is equivalent to that in the above fourth embodiment. That is, (R,G,B)=(0,0,0) is assumed, and the processing of step S23 is performed without any condition.

Next, the values are obtained in the band 2. In step S21, it is seen from the band-wavelength conversion table 131 that the central wavelength is 450 nm. Next, the calorimetric values of XYZ are obtained from the resultant wavelength in step S22. Since it is seen in step S21 that the band 2 has a=(R'sRGB,G'sRGB,B'sRGB). In a case where R, G, and B are 0.0031308 or less, R'sRGB, G'sRGB, and B'sRGB are set to the following values:

$R'sRGB = 12.92 \times Ro$;

$G'sRGB = 12.92 \times Go$; and $B'sRGB = 12.92 \times Bo$.

Moreover, in a case where Ro, Go, and Bo exceed 0.0031308, R'sRGB, G'sRGB, and B'sRGB are set to the following values:

$R'sRGB = 1.055 \times Ro^{(1.0/2.4)} - 0.55$;

$G'sRGB = 1.055 \times Go^{(1.0/2.4)} - 0.55$; and $B'sRGB = 1.055 \times Bo^{(1.0/2.4)} - 0.55$.

Furthermore, the RGB value is an 8-bit value of 0 to 255. Therefore, when R8bit, G8bit, and B8bit are set as follows, (R,G,B)=(R8bit,G8bit,B8bit) is obtained:

$R8bit = \text{round}(255.0 \times R'sRGB)$;

$G8bit = \text{round}(255.0 \times G'sRGB)$; and $B8bit = \text{round}(255.0 \times B'sRGB)$.

Therefore, since (X,Y,Z)=(X450,Y450,Z450) is obtained in the band 2, the RGB value is obtained from the above equation by use of this value. Moreover, in step S23, the bands are represented by colors in the same manner as in the fourth embodiment.

The RGB values corresponding to the bands are similarly successively obtained in the remaining bands 2 to 8, and the bands are represented by the colors in step S23. Since the central wavelength is described as wavelength of 450 nm, the wavelength is applied to the wavelength-XYZ conversion table 133. In this wavelength-XYZ conversion table 133, values of X, Y, and Z as the calorimetric values are described with respect to a wavelength of 380 nm to 780 nm in a first column. An actual value in 450 nm is omitted from FIG. 13, but (X,Y,Z)=(X450,Y450,Z450) is assumed.

Thereafter, this calorimetric value is converted into the RGB value. Any method of obtaining the RGB value may be used, but here there will be described a method of obtaining sRGB by use of this XYZ value. Details of conversion into sRGB are standardized as IEC 61966-2-1. It is to be noted that IEC is an abbreviation of International Electrotechnical Commission. When γ-correction to a monitor is set to 2.2, the XYZ value is converted into sRGB by the following equation. Assuming that a value is (Ro,Go,Bo) which is not corrected with γ and which is linearly converted in a matrix, the value can be calculated from (X,Y,Z) obtained from the wavelength-XYZ conversion table 133 by the following equation:

$$\begin{vmatrix} Ro \\ Go \\ Bo \end{vmatrix} = \begin{vmatrix} 3.2406 & -1.5372 & -0.4986 \\ -0.9689 & 1.8758 & 0.0415 \\ 0.0557 & -0.2040 & 1.0570 \end{vmatrix} \times \begin{vmatrix} X \\ Y \\ Z \end{vmatrix} \qquad \text{[Equation 1]}$$

If Ro, Go, and Bo exceed 1.0, the value is set to 1.0. If the value is less than 0.0, the value is set to 0.0. Next, this value is converted into γ-corrected sR'G'B'="White" in the last band 9 in the band-wavelength conversion table 131, (R,G,B)=(255, 255,255) is assumed without any condition, and the processing of step S23 is performed in the same manner as in the fourth embodiment.

As a result, the RGB value can be obtained, and the bands can be represented by the colors in the same manner as in the above third embodiment in which the band-RGB conversion table 13 is referred to in the step S12 of FIG. 3.

It is to be noted that in the present embodiment, it is presumed that the multiband camera 1 has nine bands. However, when the method of the present embodiment is performed, the number of the bands does not have to be especially nine, and the number of the band-wavelength conversion tables 131 may be increased or decreased to handle the bands. The bands which are not related to the wavelength are represented by "Black" and "White", and the respective RGB values are obtained as (R,G,B)=(0,0,0) and (R,G,B)=(255,255,255), but the representing terms may be changed, or other types may be increased, and the corresponding RGB values may be defined. In the wavelength-XYZ conversion table 133, the wavelengths are shown every nm in a typical visible regions of 380 nm to 780 nm. However, start and end of the table may not be limited to 380 nm and 780 nm, and an interval does not have to be 1 nm. The interval may be set to, for example, 10 nm, and the RGB values may be obtained with respect to a portion where any value does not exist by use of a certain interpolating method.

Moreover, the method of converting into sRGB has been used as a method of converting the colorimetric value (X,Y,Z) into the RGB value, but γ-correction or another coefficient may differ. A method other than the sRGB conversion may be used. That is, any method may be used as long as the color representing the wavelength is finally approximated to obtain the RGB value.

Furthermore, in the above wavelength-XYZ conversion table 133, (X,Y,Z) as the calorimetric value has been used, but as a relative ratio of the value, (x,y,z) (wherein $x=X/(X+Y+Z)$, $y=Y/(X+Y+Z)$, and $z=Z/(X+Y+Z)$) may be referred to or another value may be referred to such as L*a*b*, HVC, HLS, YUV(YCrCb), HSB, YIG, or VMY as long as the RGB value is finally obtained by the subsequent calculation.

When the bands of the multiband camera 1 are represented by the colors, and the bands are further assigned to the display colors in the setting GUI 153 shown in FIG. 6 by the above-described method, the bands can be visually assigned while comparing the original colors of the bands with the display colors. When the assigned colors are not limited to the primary colors of R, G, and B, and the bands are assigned to the neutral colors, the arbitrary number of objects can be stored without fixing the assignments to the three primary colors. In consequence, there is an effect that the user can evaluate the image photographed with the multiband camera 1 while being conscious of wavelengths such as the band central wavelengths, and being visually conscious of the original band colors, the output display, the number of the display colors, the number of the primary colors and the like.

Moreover, since the association between the band numbers and the RGB values corresponding to the band-RGB conversion table 13 is divided into the band-wavelength conversion table 131 and the wavelength-XYZ conversion table 133, there may be described data indicating only information on the band numbers and wavelengths such as the central wavelengths in the band-wavelength conversion table 131. If the information or data including the information of the band-wavelength conversion table 131 already exists in software which controls the multiband camera 1 for a purpose of controlling the camera, the information or the data does not have to be newly prepared for the present embodiment, and the existing information or data may be used. Moreover, the wavelengths and the calorimetric values XYZ representing the wavelengths are only described in the wavelength-XYZ conversion table 133 irrespective of the bands. Therefore, the table is not influenced even if the table is handled with the multiband camera 1 having any wavelength characteristics and any number of the bands. Therefore, a table of the XYZ values representing the wavelengths can be independently and newly prepared, or a standardized or normalized existing table can be used. Furthermore, RGB may be calculated from the calorimetric value XYZ by use of another method or calculating equation. As this calculating method, an existing method such as the sRGB conversion may be used, or the value may be calculated by a new unique method. Therefore, three portions can be divided: a portion where the band is converted into the wavelength; a portion where the wavelength is converted into a calorimetric value such as XYZ; and a portion where the calorimetric value is converted into the RGB value. There is also an effect that the band number can be represented as the color while using the independent and unique method, or replacing the existing method in each portion.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image display device which displays a multiband image acquired by a multiband camera that is capable of capturing images in at least two wavelength bands, the device comprising:
   an output screen configured to display a graphical user interface for designating, by a user, one of the bands from among all of the bands;
   a conversion table for converting a band number into a color to be represented in the graphical user interface; and
   a processing unit which obtains respective RGB colors corresponding to each of the wavelength bands based on respective band numbers of the wavelength bands using the conversion table;
   wherein the graphical user interface represents the bands by respective icons using the respective RGB colors obtained for the bands by the processing unit.

2. The image display device according to claim 1, wherein each of the icons of the graphical user interface is adapted to be clicked by the user so as to designate the band represented by the icon.

3. The image display device according to claim 1, wherein the conversion table stores the band numbers of the bands directly in correspondence with RGB colors; and
   wherein the processing unit obtains the respective RGB colors corresponding to each of the wavelength bands directly from the respective band numbers of the bands using the conversion table.

4. The image display device according to claim 1, wherein the conversion table includes:
   a band-wavelength conversion table which stores the band numbers of the bands in correspondence with respective wavelengths corresponding to the bands; and
   a wavelength-RGB conversion table which stores the respective wavelengths corresponding to the bands in correspondence with RGB colors;
   wherein the processing unit obtains the respective wavelengths corresponding to each of the wavelength bands from the respective band numbers of the bands using the band-wavelength conversion table, and the processing unit obtains the respective RGB colors corresponding to each of the wavelength bands from the respective wavelengths of the bands using the wavelength-RGB conversion table.

5. An image display device which displays a multiband image acquired by a multiband camera that is capable of capturing images in at least two wavelength bands, the device comprising:
   an output screen configured to represent one of each band itself and an image of the band;
   a conversion table for converting a band number into a color to be represented on the output screen; and
   a processing unit configured to calculate one of the band itself and a color representing the image of the band from the band number by use of the conversion table and to output one of the band and the color to the output screen;

wherein the conversion table includes:
  a band-wavelength conversion table for obtaining a wavelength from the band number; and
  a wavelength-XYZ conversion table for converting, into at least a colorimetric value XYZ, the wavelength obtained using the band-wavelength conversion table, and
wherein the processing unit converts the colorimetric value XYZ obtained using the wavelength-XYZ conversion table into an RGB color for use on the output screen as the color representing the image of the band.

6. A method for an image display device, which comprises an output screen and which displays a multiband image acquired by a multiband camera that is capable of capturing images in at least two wavelength bands, the method comprising:
  preparing a conversion table for converting a band number into a color to be represented on the output screen;
  obtaining respective RGB colors corresponding to each of the wavelength bands based on respective band numbers of the wavelength bands using the conversion table; and
  displaying, on the output screen, a graphical user interface for designating, by a user, one of the bands from among all of the bands, wherein the graphical user interface represents the bands by respective icons using the respective RGB colors obtained for the bands.

7. The method according to claim 6, wherein each of the icons of the graphical user interface is adapted to be clicked by the user so as to designate the band represented by the icon.

8. The method according to claim 6, wherein the conversion table stores the band numbers of the bands directly in correspondence with RGB colors; and
  wherein the respective RGB colors corresponding to each of the wavelength bands are obtained directly from the respective band numbers of the bands using the conversion table.

9. The method according to claim 6, wherein the conversion table includes:
  a band-wavelength conversion table which stores the band numbers of the bands in correspondence with respective wavelengths corresponding to the bands; and
  a wavelength-RGB conversion table which stores the respective wavelengths corresponding to the bands in correspondence with RGB colors;
  wherein the respective wavelengths corresponding to each of the wavelength bands are obtained from the respective band numbers of the bands using the band-wavelength conversion table, and the respective RGB colors corresponding to each of the wavelength bands are obtained from the respective wavelengths of the bands using the wavelength-RGB conversion table.

10. A method for an image display device, which comprises an output screen and which displays a multiband image acquired by a multiband camera that is capable of capturing images in at least two wavelength bands, the method comprising:
  preparing a conversion table for converting a band number into a color representing one of a band itself and an image of the band on the output screen; and
  calculating one of the band itself and the color representing the image of the band from the band number by use of the conversion table to output one of the band and the color to the output screen;
  wherein the conversion table includes:
    a band-wavelength conversion table for obtaining a wavelength from the band number; and
    a wavelength-XYZ conversion table for converting, into at least a colorimetric value XYZ, the wavelength obtained using the band-wavelength conversion table, and
  wherein the colorimetric value XYZ obtained using the wavelength-XYZ conversion table is converted into an RGB color for use on the output screen.

11. An image display device which displays a multiband image acquired by a multiband camera that is capable of capturing images in at least two wavelength bands, the device comprising:
  display means for displaying a graphical user interface for designating, by a user, one of the bands from among all of the bands;
  a conversion table for converting a band number into a color represented to be represented in the graphical user interface; and
  processing means for obtaining respective RGB colors corresponding to each of the wavelength bands based on respective band numbers of the wavelength bands using the conversion table;
  wherein the graphical user interface represents the bands by respective icons using the respective RGB colors obtained for the bands by the processing means.

* * * * *